United States Patent
Makino et al.

(10) Patent No.: US 11,352,912 B2
(45) Date of Patent: Jun. 7, 2022

(54) STEAM TURBINE FACILITY AND COMBINED CYCLE PLANT

(71) Applicant: MITSUBISHI POWER, LTD., Yokohama (JP)

(72) Inventors: Masaomi Makino, Yokohama (JP); Yuichiro Waki, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 17/050,965

(22) PCT Filed: Jun. 28, 2019

(86) PCT No.: PCT/JP2019/025842
§ 371 (c)(1),
(2) Date: Oct. 27, 2020

(87) PCT Pub. No.: WO2020/009025
PCT Pub. Date: Jan. 9, 2020

(65) Prior Publication Data
US 2021/0215068 A1     Jul. 15, 2021

(30) Foreign Application Priority Data

Jul. 4, 2018   (JP) .............................. JP2018-127214

(51) Int. Cl.
*F01K 23/16*    (2006.01)
*F01D 25/24*    (2006.01)
*F01K 23/10*    (2006.01)

(52) U.S. Cl.
CPC .............. *F01K 23/16* (2013.01); *F01D 25/24* (2013.01); *F01K 23/10* (2013.01);
(Continued)

(58) Field of Classification Search
CPC .......... F01K 23/16; F01K 23/10; F01D 25/24; F05D 2220/31; F05D 2240/60; F05D 2240/52
(Continued)

(56) References Cited

U.S. PATENT DOCUMENTS 6,988,869 B2 *  1/2006  Haje ....................... F01D 25/16
                                                                415/104
8,425,180 B2 *  4/2013  Sears ...................... F01K 23/16
                                                                415/107
(Continued)

FOREIGN PATENT DOCUMENTS

EP       1 335 110 B1     1/2007
GB         100369 A       4/1917
(Continued)

OTHER PUBLICATIONS

Notification Concerning Transmittal of International Preliminary Report on Patentability (Forms PCT/IB/326) issued in counterpart International Application No. PCT/JP2019/025842 dated Jan. 14, 2021 with Forms PCT/IB/373, PCT/IB/338 and PCT/ISA/237. (17 pages).
(Continued)

*Primary Examiner* — Hoang M Nguyen
(74) *Attorney, Agent, or Firm* — Westerman, Hattori, Daniels & Adrian, LLP

(57) ABSTRACT

A steam turbine facility includes a rotor shaft, a high-pressure turbine blade row and an intermediate-pressure turbine blade row disposed on the rotor shaft, a first low-pressure turbine blade row and a second low-pressure turbine blade row disposed on the rotor shaft on both sides of the intermediate-pressure turbine blade row, respectively, and a third low-pressure turbine blade row and a fourth low-pressure turbine blade row disposed on the rotor shaft on both sides of the high-pressure turbine blade row, respec-
(Continued)

tively. The steam turbine facility is configured such that steam having passed through the intermediate-pressure turbine blade row is divided to flow into the first low-pressure turbine blade row, the second low-pressure turbine blade row, the third low-pressure turbine blade row, and the fourth low-pressure turbine blade row.

12 Claims, 3 Drawing Sheets

(52) U.S. Cl.
CPC ...... *F05D 2220/31* (2013.01); *F05D 2240/52* (2013.01); *F05D 2240/60* (2013.01)

(58) Field of Classification Search
USPC ................. 60/653, 677–680; 415/104–107
See application file for complete search history.

(56) References Cited

U.S. PATENT DOCUMENTS

| | | | |
|---|---|---|---|
| 2003/0175117 A1 | 9/2003 | Klaus et al. | |
| 2005/0022529 A1* | 2/2005 | Takahashi | C22C 38/44 60/653 |
| 2006/0216145 A1 | 9/2006 | Arai et al. | |
| 2009/0185895 A1* | 7/2009 | Wieghardt | F01D 3/04 415/104 |
| 2010/0202876 A1 | 8/2010 | Nishimoto et al. | |
| 2011/0158790 A1 | 6/2011 | Sears et al. | |
| 2012/0223532 A1 | 9/2012 | Herzog et al. | |
| 2013/0216354 A1 | 8/2013 | Maruyama et al. | |
| 2019/0353055 A1* | 11/2019 | Nishikawa | F01D 11/04 |

FOREIGN PATENT DOCUMENTS

| | | |
|---|---|---|
| JP | H08-177409 A | 7/1996 |
| JP | 3529412 B2 | 5/2004 |
| JP | 2005-315122 A | 11/2005 |
| JP | 2006-022343 A | 1/2006 |
| JP | 2011-137449 A | 7/2011 |
| JP | 2012-057615 A | 3/2012 |
| JP | 4898955 B2 | 3/2012 |
| JP | 2012-219682 A | 11/2012 |
| JP | 2013-170468 A | 9/2013 |

OTHER PUBLICATIONS

International Search Report dated Jul. 30, 2019, issued in counterpart Application No. PCT/JP2019/025842, with English Translation. (12 pages).

Office Action dated Feb. 23, 2022, issued in counterpart DE application No. 11 2019 002 207.5. (7 pages).

\* cited by examiner

STEAM TURBINE FACILITY AND COMBINED CYCLE PLANT

TECHNICAL FIELD

The present disclosure relates to a steam turbine facility and a combined cycle plant.

BACKGROUND

In a large-capacity steam turbine used for a combined cycle plant or the like, in order to deal with a large amount of inflow steam, besides a turbine blade row and a turbine into which high-pressure main steam flows, a turbine blade row and a turbine into which lower-pressure steam flows may be provided.

For example, Patent Document 1 discloses a four-flow exhaust type steam turbine power generation plant, where a high-pressure steam turbine to which high-pressure steam is introduced, an intermediate-pressure steam turbine to which lower-pressure steam is introduced, two double-flow exhaust type low-pressure steam turbine to which further-lower-pressure steam is introduced, and a generator are disposed on a single shaft.

CITATION LIST

Patent Literature

Patent Document 1: JP2006-22343A

SUMMARY

Technical Problem

Meanwhile, conventionally, in a large-capacity steam turbine facility, in order to improve performance, a configuration is generally adopted where turbine blade rows such as a high-pressure turbine blade row, an intermediate-pressure turbine blade row, and a low-pressure turbine blade row are accommodated in different casings. For example, in the case of a high-performance steam turbine of a four-flow exhaust type including a high-pressure turbine blade row, an intermediate-pressure turbine blade row, and two sets of double-flow exhaust type low-pressure turbine blade rows, a four-casing configuration has generally been adopted.

With the configuration where the respective turbine blade rows are thus accommodated in the different casings, it is possible to achieve the high-performance steam turbine. On the other hand, however, the total length of the turbine increases, and thus a facility cost of a building or the like where the steam turbines are accommodated tends to increase.

In view of the above, an object of at least one embodiment of the present invention is to provide a steam turbine facility capable of reducing the facility cost while having high performance and a combined cycle plant including the same.

Solution to Problem (1) A steam turbine facility according to at least one embodiment of the present invention includes a rotor shaft, a high-pressure turbine blade row and an intermediate-pressure turbine blade row disposed on the rotor shaft, a first low-pressure turbine blade row and a second low-pressure turbine blade row disposed on the rotor shaft on both sides of the intermediate-pressure turbine blade row, respectively, and a third low-pressure turbine blade row and a fourth low-pressure turbine blade row disposed on the rotor shaft on both sides of the high-pressure turbine blade row, respectively. The steam turbine facility is configured such that steam having passed through the intermediate-pressure turbine blade row is divided to flow into the first low-pressure turbine blade row, the second low-pressure turbine blade row, the third low-pressure turbine blade row, and the fourth low-pressure turbine blade row.

With the above configuration (1), since a four-flow exhaust type is adopted where the high-pressure turbine blade row, the intermediate-pressure turbine blade row, and the first to fourth low-pressure turbine blade rows are disposed on the one rotor shaft, and the steam having passed through the intermediate-pressure turbine blade row is divided to flow into each of the first to fourth low-pressure turbine blade rows, it is possible to have performance comparable to that of the above-described conventional high-performance steam turbine of a four-casing configuration (that is, the four-flow exhaust type steam turbine including the high-pressure turbine blade row, the intermediate-pressure turbine blade row, and two sets of double-flow exhaust type low-pressure turbine blade rows). Moreover, in the above configuration (1), since the pair of low-pressure turbine blade rows (the first low-pressure turbine blade row and the second low-pressure turbine blade row) are disposed on the both sides of the intermediate-pressure turbine blade row, respectively, it is possible to accommodate these turbine blade rows in one casing, and since the pair of low-pressure turbine blade rows (the third low-pressure turbine blade row and the fourth low-pressure turbine blade row) are disposed on the both sides of the high-pressure turbine blade row, respectively, it is possible to accommodate these turbine blade rows in one casing. Thus, it is possible to implement the steam turbine facility of a two-casing configuration.

That is, with the above configuration (1), it is possible to reduce an installation area by reducing the number of casings than ever before, while implementing performance corresponding to that of the conventional high-performance steam turbine having four casings. Therefore, it is possible to implement the steam turbine facility capable of reducing a facility cost, while having high performance.

(2) In some embodiments, in the above configuration (1), the steam turbine facility further includes a first pair of radial bearings and a second pair of radial bearings for rotatably supporting the rotor shaft. The intermediate-pressure turbine blade row, the first low-pressure turbine blade row, and the second low-pressure turbine blade row are disposed on the rotor shaft in a bearing span of the first pair of radial bearings, and the high-pressure turbine blade row, the third low-pressure turbine blade row, and the fourth low-pressure turbine blade row are disposed on the rotor shaft in a bearing span of the second pair of radial bearings.

With the above configuration (2), since the intermediate-pressure turbine blade row and the pair of low-pressure turbine blade rows (the first low-pressure turbine blade row and the second low-pressure turbine blade row) are disposed in the bearing span of the pair of radial bearings, respectively, it is possible to accommodate these turbine blade rows in the single casing, and since the high-pressure turbine blade row and the pair of low-pressure turbine blade rows (the third low-pressure turbine blade row and the fourth low-pressure turbine blade row) are disposed in the bearing span of the pair of radial bearings, respectively, it is possible to accommodate these turbine blade rows in the single casing. Thus, it is possible to implement the steam turbine facility of the two-casing configuration, and to reduce the installation area as compared to the conventional high-performance steam turbine.

(3) In some embodiments, in the above configuration (1) or (2), the steam turbine facility further includes a first casing for accommodating the intermediate-pressure turbine blade row, the first low-pressure turbine blade row, and the second low-pressure turbine blade row, and a second casing for accommodating the high-pressure turbine blade row, the third low-pressure turbine blade row, and the fourth low-pressure turbine blade row.

With the above configuration (3), since the intermediate-pressure turbine blade row and the pair of low-pressure turbine blade rows (the first low-pressure turbine blade row and the second low-pressure turbine blade row) are accommodated in the first casing, and the high-pressure turbine blade row and the pair of low-pressure turbine blade rows (the third low-pressure turbine blade row and the fourth low-pressure turbine blade row) are accommodated in the second casing, it is possible to reduce the installation area as compared to the conventional high-performance steam turbine, with the steam turbine facility having the two-casing configuration.

(4) In some embodiments, in the above configuration (3), the steam turbine facility further includes a thrust bearing for rotatably supporting the rotor shaft. The thrust bearing is disposed between the first casing and the second casing.

With the above configuration (4), since the thrust bearing is disposed between the casings (that is, between the first casing and the second casing), it is possible to reduce an influence by thermal expansion of the casings and components accommodated in the casings, respectively, on both sides of the thrust bearing in the axial direction.

(5) In some embodiments, in any one of the above configurations (1) to (4), the first low-pressure turbine blade row is disposed downstream of the intermediate-pressure turbine blade row in a steam flow direction in the intermediate-pressure turbine blade row, and the steam turbine facility includes a branched channel for introducing a part of a steam flow from the intermediate-pressure turbine blade row toward the first low-pressure turbine blade row to the second low-pressure turbine blade row, the third low-pressure turbine blade row, and the fourth low-pressure turbine blade row.

With the above configuration (5), since the part of the steam flow from the intermediate-pressure turbine blade row toward the first low-pressure turbine blade row is introduced to the second low-pressure turbine blade row, the third low-pressure turbine blade row, and the fourth low-pressure turbine blade row via the branched channel, it is possible to implement the high-performance steam turbine facility of the four-flow exhaust type, while achieving the two-casing configuration capable of reducing the installation area.

(6) In some embodiments, in the above configuration (5), the steam turbine facility includes a first casing for accommodating the intermediate-pressure turbine blade row, the first low-pressure turbine blade row, and the second low-pressure turbine blade row, and a second casing for accommodating the high-pressure turbine blade row, the third low-pressure turbine blade row, and the fourth low-pressure turbine blade row. The branched channel includes a first inner channel disposed so as to cause an inlet side of the first low-pressure turbine blade row and an inlet side of the second low-pressure turbine blade row to communicate with each other, in the first casing, a second inner channel disposed so as to cause an inlet side of the third low-pressure turbine blade row and an inlet side of the fourth low-pressure turbine blade row to communicate with each other, in the second casing, and a connection pipe having an end connected to the first inner channel in the first casing and another end connected to the second inner channel in the second casing.

With the above configuration (6), since a portion of the branched channel, which causes the pair of low-pressure turbine blade rows accommodated in the same casing to communicate with each other, is disposed as the inner channel inside the casing, and a portion of the branched channel, which causes the first/second low-pressure turbine blade rows and the third/fourth low-pressure turbine blade rows accommodated in the different casings to communicate with each other, is formed by the connection pipe, it is possible to implement the four-flow exhaust type steam turbine facility, while enabling downsizing of the steam turbine facility.

(7) In some embodiments, in the above configuration (5) or (6), the steam turbine facility includes a first casing for accommodating the intermediate-pressure turbine blade row, the first low-pressure turbine blade row, and the second low-pressure turbine blade row. The first casing includes an inner casing for accommodating the intermediate-pressure turbine blade row, and an outer casing for accommodating the inner casing, and at least a part of the first low-pressure turbine blade row and the second low-pressure turbine blade row, and the branched channel is formed at least partially by an outer surface of the inner casing and an inner surface of the outer casing.

With the above configuration (7), since the branched channel is formed at least partially by using the outer casing and the inner casing positioned on the inner side of the outer casing, it is possible to implement the steam turbine facility capable of reducing the installation area and having high performance, by the simple configuration.

(8) In some embodiments, in the above configuration (5) or (6), the steam turbine facility includes a first casing for accommodating the intermediate-pressure turbine blade row, the first low-pressure turbine blade row, and the second low-pressure turbine blade row. The first casing includes an inner casing for accommodating the intermediate-pressure turbine blade row, and an outer casing for accommodating the inner casing, and at least a part of the first low-pressure turbine blade row and the second low-pressure turbine blade row, and the branched channel is formed at least partially by a pipe passing outside the outer casing.

With the above configuration (8), since the branched channel is formed at least partially by the pipe passing outside the outer casing, it is possible to implement the steam turbine facility capable of reducing the installation area and having high performance, by the simple configuration.

(9) In some embodiments, in any one of the above configurations (5) to (8), the steam turbine facility further includes a steam introduction path connected to the branched channel, for introducing steam having a pressure lower than a pressure of steam in an inlet of the first low-pressure turbine blade row.

In the above configuration (9), since the above-described steam introduction path connected to the branched channel is provided, the steam with the lower pressure introduced from the steam introduction path to the branched channel is introduced to the third and fourth low-pressure turbine blade rows via the branched channel, in addition to a part of steam flowing into the inlet of the first low-pressure turbine blade row (for example, exhaust air from the intermediate-pressure turbine blade row, or steam from a low-pressure drum or a low-pressure evaporator of a boiler). Therefore, with the above configuration (9), it is possible to improve output power of the steam turbine facility.

(10) In some embodiments, in any one of the above configurations (1) to (9), the steam turbine facility is configured such that steam flowing through the high-pressure turbine blade row and steam flowing through the intermediate-pressure turbine blade row flow in opposite directions to each other in an axial direction, the steam turbine facility is configured such that steam flowing through the first low-pressure turbine blade row and steam flowing through the second low-pressure turbine blade row flow in opposite directions to each other in the axial direction, and the steam turbine facility is configured such that steam flowing through the third low-pressure turbine blade row and steam flowing through the fourth low-pressure turbine blade row flow in opposite directions to each other in the axial direction.

With the above configuration (10), since the respective turbine blade rows are disposed such that the steam flowing through the high-pressure turbine blade row and the steam flowing through the intermediate-pressure turbine blade row flow in the opposite directions to each other in the axial direction, and the steams flowing through the first/second pair of low-pressure turbine blade rows, respectively, flow in the opposite directions to each other in the axial direction, it is possible to balance a thrust load acting on the rotor shaft.

(11) In some embodiments, in any one of the above configurations (1) to (10), the steam turbine facility further includes an exhaust chamber for discharging steam from the first low-pressure turbine blade row and from the second low-pressure turbine blade row toward a condenser. The exhaust chamber has an exhaust chamber outlet disposed on a lateral side thereof With the above configuration (11), the steam having passed through the first/second low-pressure turbine blade rows is laterally exhausted toward the condenser via the exhaust chamber outlet disposed on the lateral side of the exhaust chamber. That is, since the condenser can be disposed on the lateral side of the exhaust chamber, it is possible to reduce the size of the steam turbine facility in the height direction, as compared with a case in which the condenser is positioned below the exhaust chamber. Therefore, it is possible to reduce the facility cost of the steam turbine facility more effectively.

(12) In some embodiments, in any one of the above configurations (1) to (11), the steam turbine facility further includes a condenser for condensing steam from the first low-pressure turbine blade row and from the second low-pressure turbine blade row.

(13) A combined cycle plant according to at least one embodiment of the present invention includes a gas turbine facility, a boiler for generating steam by heat of a discharged gas from the gas turbine facility, and the steam turbine facility according to any one of the above configurations (1) to (12). The steam turbine facility is configured to be driven by the steam generated by the boiler.

With the above configuration (13), since a four-flow exhaust type is adopted where the high-pressure turbine blade row, the intermediate-pressure turbine blade row, and the first to fourth low-pressure turbine blade rows are disposed on the one rotor shaft, and the steam having passed through the intermediate-pressure turbine blade row is divided to flow into each of the first to fourth low-pressure turbine blade rows, it is possible to have performance comparable to that of the above-described conventional high-performance steam turbine of a four-casing configuration (that is, the four-flow exhaust type steam turbine including the high-pressure turbine blade row, the intermediate-pressure turbine blade row, and two sets of double-flow exhaust type low-pressure turbine blade rows). Moreover, in the above configuration (13), since the pair of low-pressure turbine blade rows (the first low-pressure turbine blade row and the second low-pressure turbine blade row) are disposed on the both sides of the intermediate-pressure turbine blade row, respectively, it is possible to accommodate these turbine blade rows in one casing, and since the pair of low-pressure turbine blade rows (the third low-pressure turbine blade row and the fourth low-pressure turbine blade row) are disposed on the both sides of the high-pressure turbine blade row, respectively, it is possible to accommodate these turbine blade rows in one casing. Thus, it is possible to implement the steam turbine facility of a two-casing configuration.

That is, with the above configuration (13), it is possible to reduce an installation area by reducing the number of casings than ever before, while implementing performance corresponding to that of the conventional high-performance steam turbine having four casings. Therefore, it is possible to implement the combined cycle plant including the steam turbine facility capable of reducing the facility cost, while having high performance.

Advantageous Effects

According to at least one embodiment of the present invention, a steam turbine facility capable of reducing a facility cost while having high performance and a combined cycle plant including the same are provided.

DETAILED DESCRIPTION

Figure 1:
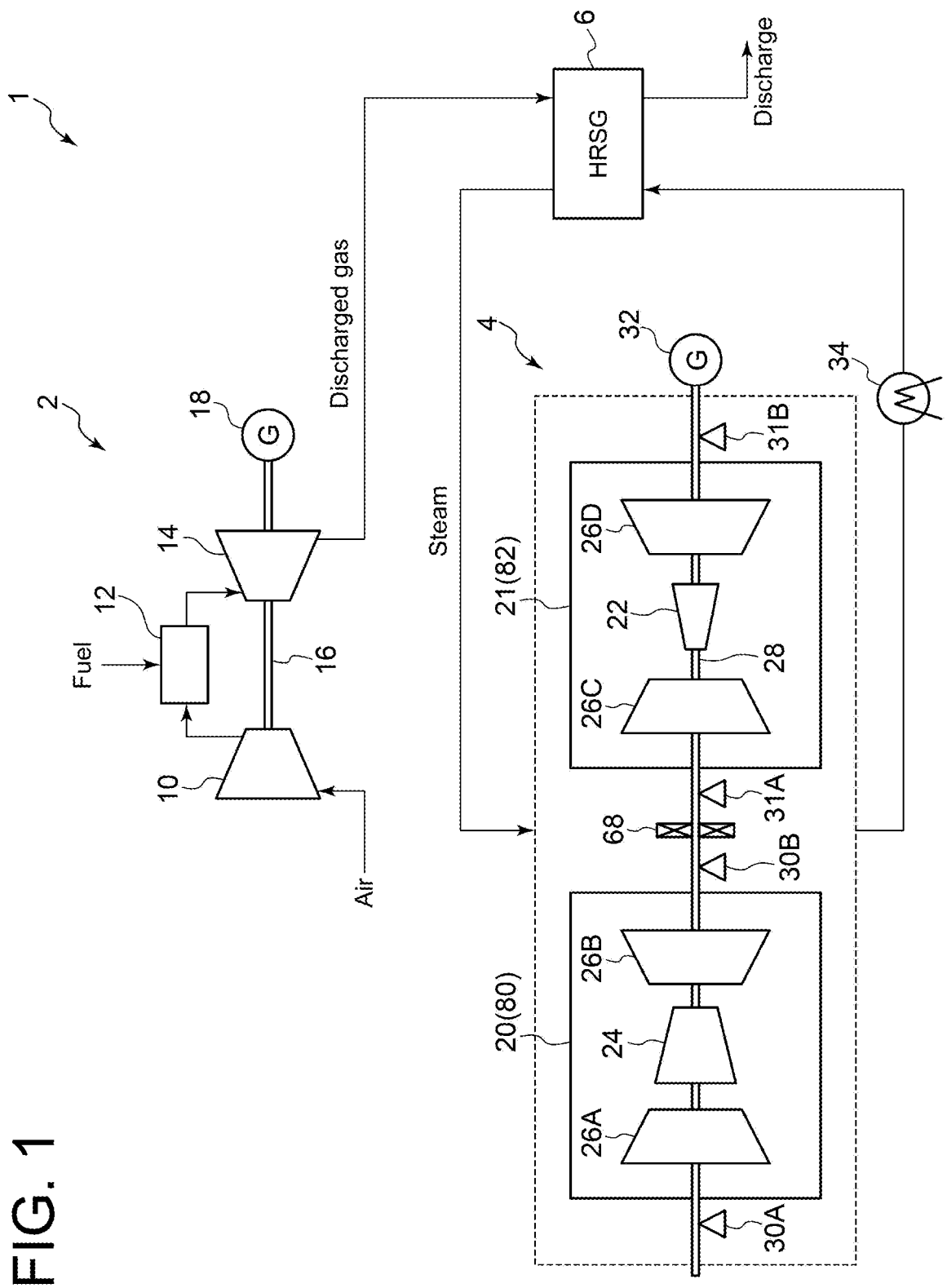
FIG. 1 is a schematic configuration diagram of a combined cycle plant according to an embodiment.

Some embodiments of the present invention will be described below with reference to the accompanying drawings. It is intended, however, that unless particularly identified, dimensions, materials, shapes, relative positions and the like of components described in the embodiments or shown in the drawings shall be interpreted as illustrative only and not intended to limit the scope of the present invention.

First, a combined cycle plant to which a steam turbine facility according to some embodiments is applied will be described with reference to FIG. 1.

FIG. 1 is a schematic configuration diagram of the combined cycle plant according to an embodiment. As shown in the diagram, a combined cycle plant 1 is a gas turbine combined cycle (GTCC) plant including a gas turbine facility 2, a heat recovery steam generator (HRSG) 6 (boiler), and a steam turbine facility 4.

The gas turbine facility 2 shown in FIG. 1 includes a compressor 10, a combustor 12, and a turbine 14. The compressor 10 is configured to compress air to produce compressed air. The combustor 12 is configured to generate a combustion gas by a combustion reaction between the compressed air from the compressor 10 and a fuel (for example, a natural gas or the like). The turbine 14 is configured to be rotary driven by the combustion gas from the combustor 12. The turbine 14 is connected to a generator 18 via a rotational shaft 16. The generator 18 is driven by rotational energy of the turbine 14 to generate electric power. The combustion gas having finished work in the turbine 14 is discharged from the turbine 14 as a discharged gas.

The heat recovery steam generator 6 is configured to generate steam by heat of the discharged gas from the gas turbine facility 2.

The heat recovery steam generator 6 includes a duct (not shown) to which the discharged gas from the gas turbine facility 2 is introduced and a heat exchanger (not shown) disposed so as to pass inside the duct. Into the heat exchanger, condensate water from a condenser 34 of the steam turbine facility 4 to be described later is introduced. In the heat exchanger, steam is generated by heat exchange between the condensate water and the discharged gas flowing through the above-described duct.

Note that the discharged gas having flown through the duct of the heat recovery steam generator 6 and passed through the heat exchanger may be discharged from a stack (not shown).

The steam turbine facility 4 shown in FIG. 1 includes a plurality of turbine blade rows 22, 24, 26A to 26D and is configured to be driven by the steam from the heat recovery steam generator 6.

The steam generated by the heat recovery steam generator 6 is introduced to the steam turbine facility 4. The steam turbine facility 4 is rotary driven by the steam. Moreover, the steam turbine facility 4 is connected to a generator 32 via a rotor shaft 28. The generator 32 is rotary driven by the steam turbine facility 4 to generate electric power.

The steam turbine facility 4 according to some embodiments will be described below in more detail.

Figure 2:
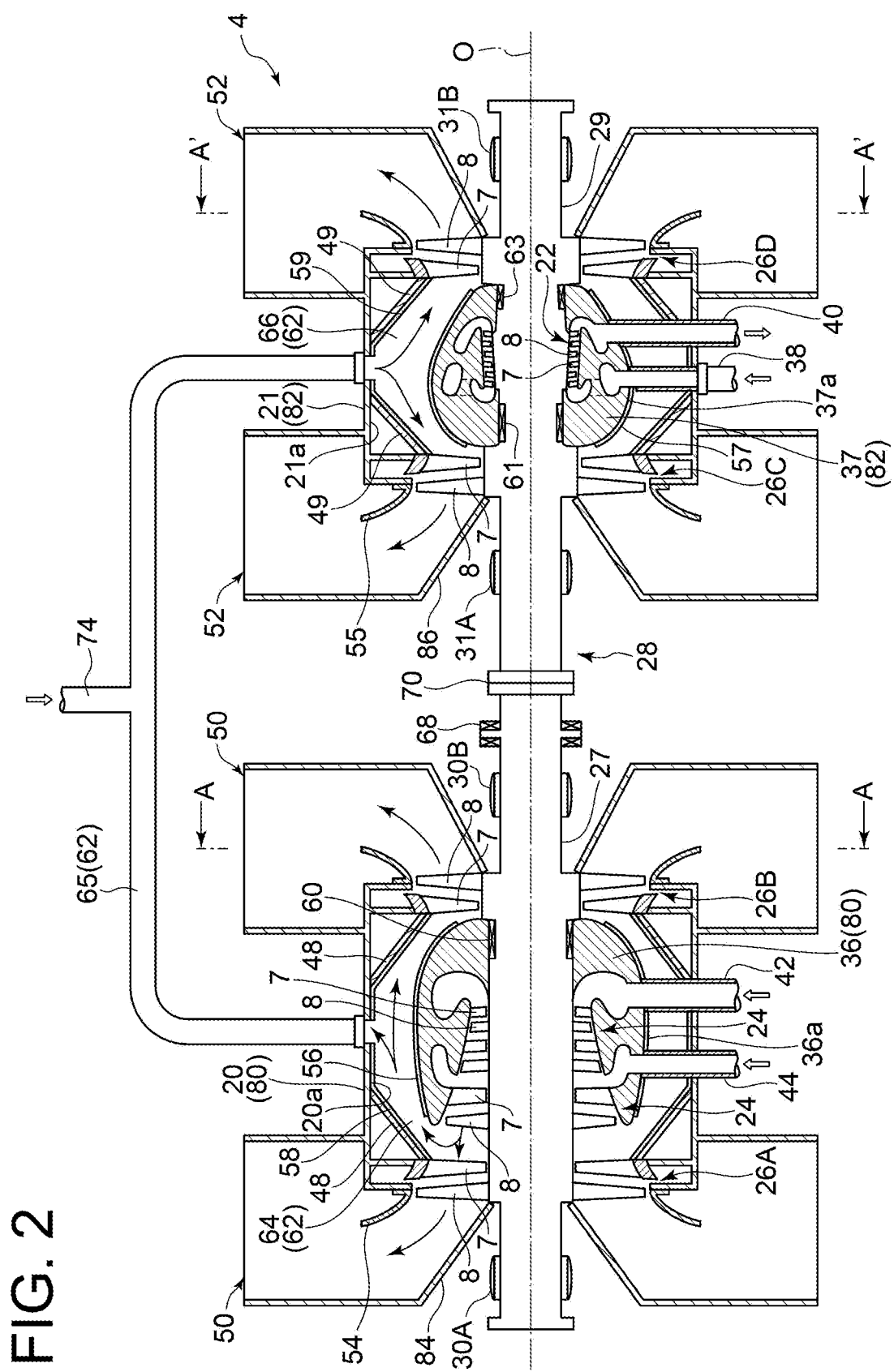
FIG. 2 is a schematic cross-sectional view of a steam turbine facility according to an embodiment, taken along its axial direction.

FIG. 2 is a schematic cross-sectional view of the steam turbine facility 4 according to an embodiment, taken along its axial direction. Note that arrows in FIG. 2 each indicate the direction of a steam flow in the steam turbine facility 4.

As shown in FIGS. 1 and 2, the steam turbine facility 4 includes the rotor shaft 28, a first pair of radial bearings 30A, 30B, a second pair of radial bearings 31A, 31B, and a thrust bearing 68 for rotatably supporting the rotor shaft 28, the turbine blade rows 22, 24, 26A to 26D disposed on the rotor shaft 28, and a first casing 80 and a second casing 82.

The above-described turbine blade rows include the high-pressure turbine blade row 22 where high-pressure steam from a boiler (such as the above-described heat recovery steam generator) is introduced, the intermediate-pressure turbine blade row 24 where steam of a lower pressure (intermediate-pressure steam) is introduced, and the first low-pressure turbine blade row 26A to the fourth low-pressure turbine blade row 26D where steam of a further lower pressure (low-pressure steam) is introduced.

Note that in the present specification, the "low-pressure turbine blade row" means a turbine blade row disposed downstream of a branched channel 62 to be described later.

The first low-pressure turbine blade row 26A and the second low-pressure turbine blade row 26B are disposed on both sides of the intermediate-pressure turbine blade row 24 in the axial direction, respectively. The intermediate-pressure turbine blade row 24, the first low-pressure turbine blade row 26A, and the second low-pressure turbine blade row 26B are disposed on a first shaft part 27 of the rotor shaft 28, in a bearing span of the first pair of radial bearings 30A, 30B. Then, these turbine blade rows (the intermediate-pressure turbine blade row 24, the first low-pressure turbine blade row 26A, and the second low-pressure turbine blade row 26B) are accommodated in the first casing 80.

Moreover, the third low-pressure turbine blade row 26C and the fourth low-pressure turbine blade row 26D are disposed on both sides of the high-pressure turbine blade row 22 in the axial direction, respectively. The high-pressure turbine blade row 22, the third low-pressure turbine blade row 26C, and the fourth low-pressure turbine blade row 26D are disposed on a second shaft part 29 of the rotor shaft 28, in a bearing span of the second pair of radial bearings 31A, 31B. Then, these turbine blade rows (the high-pressure turbine blade row 22, the third low-pressure turbine blade row 26C, and the fourth low-pressure turbine blade row 26D) are accommodated in the second casing 82.

Note that any other radial bearing is not disposed in the bearing span of each pair of radial bearings, in the axial direction. That is, any other radial bearing is neither disposed between the radial bearing 30A and the radial bearing 30B, nor between the radial bearing 31A and the radial bearing 31B.

The first shaft part 27 and the second shaft part 29 are connected via a coupling 70 (see FIG. 2) disposed between the first pair of radial bearings 30A, 30B and the second pair of radial bearings 31A, 31B.

The "rotor shaft" in the present specification may thus include the plurality of shaft parts connected via the coupling 70.

The thrust bearing 68 is disposed between the first casing 80 and the second casing 82 in the axial direction. Note that in the exemplary embodiment shown in FIG. 2, the thrust bearing 68 is disposed between the coupling 70 and the first pair of radial bearings 30A, 30B. However, in another embodiment, the thrust bearing 68 may be disposed between the coupling 70 and the second pair of radial bearings 31A, 31B, or may be disposed between the radial bearing 30A and the radial bearing 30B or between the radial bearing 31A and the radial bearing 31B.

As shown in FIG. 2, the first casing 80 for accommodating the intermediate-pressure turbine blade row 24 and the first/second low-pressure turbine blade rows 26A, 26B includes an outer casing 20 and an inner casing 36 disposed inside the outer casing 20. The intermediate-pressure turbine blade row 24 is accommodated in the inner casing 36, and the inner casing 36 and the first/second low-pressure turbine blade rows 26A, 26B are accommodated in the outer casing 20.

Moreover, the second casing for accommodating the high-pressure turbine blade row 22 and the third/fourth low-pressure turbine blade rows 26C, 26D includes an outer casing 21 and an inner casing 37 disposed inside the outer casing 21. The high-pressure turbine blade row 22 is accommodated in the inner casing 37, and the inner casing 37 and the third/fourth low-pressure turbine blade rows 26C, 26D are accommodated in the outer casing 21.

The outer casing 20 of the first casing 80 includes a bearing cone part 84 disposed radially outside the radial bearings 30A, 30B. Moreover, the outer casing 21 of the second casing 82 includes a bearing cone part 86 disposed radially outside the radial bearings 31A, 31B.

Each of the turbine blade rows 22, 24, 26A to 26D includes a plurality of stator vanes 7 and rotor blades 8. The plurality of stator vanes 7 and rotor blades 8 are arranged in the circumferential direction to form rows, respectively. The rows of the stator vanes 7 and the rows of the rotor blades 8 are arranged alternately in the axial direction.

Note that each of the turbine blade rows 22, 24, 26A to 26D may include a plurality of sets of rows of the stator vanes 7 and rows of the rotor blades 8.

The stator vanes 7 of each of the turbine blade rows 22, 24, 26A to 26D are accommodated in the inner casings 36, 37 or the outer casings 20, 21 serving as stationary members, respectively.

In the exemplary embodiment shown in FIG. 2, the stator vanes 7 of the high-pressure turbine blade row 22 and the intermediate-pressure turbine blade row 24 are accommodated the inner casings 36, 37, respectively. Moreover, the low-pressure turbine blade rows 26A to 26D are accommodated in the outer casings 20, 21, respectively.

Furthermore, the rotor blades 8 of the respective turbine blade rows 22, 24, 26A to 26D are mounted on the rotor shaft 28 and rotate with the rotor shaft 28.

The inlets of the high-pressure turbine blade row 22 and the intermediate-pressure turbine blade row 24 are connected to a high-pressure inlet pipe 38 and an intermediate-pressure inlet pipe 42, respectively. Moreover, a space (steam channel) between the inlet and outlet of the intermediate-pressure turbine blade row 24 is connected to a low-pressure inlet pipe 44, in the axial direction. Moreover, the outlet of the high-pressure turbine blade row 22 is connected to a high-pressure outlet pipe 40.

High-pressure steam, intermediate-pressure steam, and low-pressure steam are introduced to the high-pressure turbine blade row 22, the intermediate-pressure turbine blade row 24, and the space (steam channel) between the inlet and outlet of the intermediate-pressure turbine blade row 24 via the high-pressure inlet pipe 38, the intermediate-pressure inlet pipe 42, and the low-pressure inlet pipe 44, respectively.

The steams introduced to the respective turbine blade rows via the high-pressure inlet pipe 38, the intermediate-pressure inlet pipe 42, and the low-pressure inlet pipe 44 may be the steams generated by the boiler described above. Moreover, the steam having passed through the high-pressure turbine blade row 22 and discharged from the high-pressure outlet pipe 40 may be re-heated by a re-heater or the like, and then may be introduced to the intermediate-pressure turbine blade row 24 via the intermediate-pressure inlet pipe 42.

As shown in FIG. 2, the first low-pressure turbine blade row 26A is disposed downstream of the intermediate-pressure turbine blade row 24 in a steam flow direction in the intermediate-pressure turbine blade row 24. That is, steam having passed through the intermediate-pressure turbine blade row 24 can flow into the inlet of the first low-pressure turbine blade row 26A.

Then, the steam turbine facility 4 includes the branched channel 62 for introducing a part of a steam flow from the intermediate-pressure turbine blade row 24 toward the first low-pressure turbine blade row 26A to the second low-pressure turbine blade row 26B, the third low-pressure turbine blade row 26C, and the fourth low-pressure turbine blade row 26D. That is, in the steam turbine facility 4, the steam having passed through the intermediate-pressure turbine blade row 24 is divided to flow into the first low-pressure turbine blade row 26A, the second low-pressure turbine blade row 26B, the third low-pressure turbine blade row 26C, and the fourth low-pressure turbine blade row 26D, via the branched channel 62.

In the exemplary embodiment shown in FIG. 2, the branched channel 62 includes a first inner channel 64 disposed inside the first casing 80, a second inner channel 66 disposed inside the second casing 82, and a connection pipe 65 disposed between the first inner channel 64 and the second inner channel 66.

The first inner channel 64 is disposed so as to cause an inlet side of the first low-pressure turbine blade row 26A and an inlet side of the second low-pressure turbine blade row 26B to communicate with each other, in the first casing 80.

The second inner channel 66 is disposed so as to cause an inlet side of the third low-pressure turbine blade row 26C and an inlet side of the fourth low-pressure turbine blade row 26D to communicate with each other, in the second casing 82.

The connection pipe 65 has an end connected to the first inner channel 64 in the first casing 80 and another end connected to the second inner channel 66 in the second casing 82.

In the steam turbine facility 4 including the above-described branched channel 62, a part of the steam having passed through the intermediate-pressure turbine blade row 24 flows into the first low-pressure turbine blade row 26A, and a part of the rest of the steam heads for the first inner channel 64. Then, a part of the steam having flown into the first inner channel 64 flows into the second low-pressure turbine blade row 26B, and a part of the rest of the steam heads for the second inner channel 66 of the second casing 82 through the connection pipe 65. A part of the steam having flown into the second inner channel 66 flows into the third low-pressure turbine blade row 26C, and the rest of the steam flows into the fourth low-pressure turbine blade row 26D.

Note that the first to fourth low-pressure turbine blade rows 26A to 26D may have the same number of stages (number of sets of rows of the stator vanes 7 and rows of the rotor blades 8) of the rows of the stator vanes 7 and rows of the rotor blades 8. FIG. 2 is a schematic view, and in the exemplary embodiment shown in FIG. 2, the number of stages of each of the first to fourth low-pressure turbine blade rows is one.

A seal part for suppressing fluid leakage may be disposed between the rotor shaft 28 and the inner casing 36, 37 in the radial direction. For example, in the exemplary embodiment shown in FIG. 2, a seal part 60 for suppressing fluid leakage between the intermediate-pressure turbine blade row 24 and the second low-pressure turbine blade row 26B is disposed in the first casing 80. Moreover, seal parts 61, 63 for suppressing fluid leakages between the high-pressure turbine blade row 22, and the third low-pressure turbine blade row 26C and the fourth low-pressure turbine blade row 26D, respectively, are disposed in the second casing 82.

In such a steam turbine facility 4, if steam is introduced to each of the turbine blade rows 22, 24, 26A to 26D, the steam expands and are increased in speed when passing through the stator vanes 7, and the steam thus increased in speed performs work on the rotor blades 8 and rotates the rotor shaft 28.

The steam turbine facility 4 also includes a pair of exhaust chambers 50 and a pair of exhaust chambers 52. The pair of exhaust chambers 50 are disposed to be positioned downstream of the low-pressure turbine blade rows 26A, 26B, respectively. Moreover, the pair of exhaust chambers 52 are disposed to be positioned downstream of the low-pressure turbine blade rows 26C, 26D, respectively.

The steams having passed through the low-pressure turbine blade rows 26A, 26B are guided by a flow guide 54 to flow into the exhaust chambers 50, pass inside the exhaust chambers 50, respectively, and are discharged via an exhaust chamber outlet 51 (see FIG. 3) disposed on each of the exhaust chambers 50.

Moreover, the steams having passed through the low-pressure turbine blade rows 26C, 26D are guided by a flow guide 55 to flow into the exhaust chambers 52, pass inside the exhaust chambers 52, respectively, and are discharged via an exhaust chamber outlet 53 (see FIG. 3) disposed on each of the exhaust chambers 52.

The condenser 34 (see FIG. 1) is disposed downstream of the exhaust chamber outlet 51, 53. The steam discharged from the exhaust chamber outlet 51, 53 flows into the condenser 34. In the condenser 34, the steam is cooled by heat exchange with cooling water to be condensed, generating condensed water (condensate water).

In some embodiments, the exhaust chamber outlets 51, 53 may be disposed on the lower sides of the exhaust chambers 50, 52, respectively, and the condenser 34 may be disposed below the exhaust chamber 50, 52. Alternatively, in some embodiments, the exhaust chamber outlets 51, 53 may be disposed on the lateral sides of the exhaust chambers 50, 52, respectively, and the condenser 34 may be disposed on the lateral side of the exhaust chamber 50, 52.

The steam turbine facility 4 according to the above-described embodiment is the four-flow exhaust type steam turbine facility 4, where the high-pressure turbine blade row 22, the intermediate-pressure turbine blade row 24, and the first to fourth low-pressure turbine blade rows 26A to 26D are disposed on the one rotor shaft 28, and the steam having passed through the intermediate-pressure turbine blade row 24 is divided to flow into each of the first to fourth turbine blade rows 26A to 26D. Thus, it is possible to have performance comparable to that of the conventional high-performance steam turbine of a four-casing configuration (that is, the four-flow exhaust type steam turbine including the high-pressure turbine blade row, the intermediate-pressure turbine blade row, and two sets of double-flow exhaust type low-pressure turbine blade rows). Moreover, in the steam turbine facility 4 according to the above-described embodiment, since the pair of low-pressure turbine blade rows (the first low-pressure turbine blade row 26A and the second low-pressure turbine blade row 26B) are disposed on the both sides of the intermediate-pressure turbine blade row 24, respectively, it is possible to accommodate these turbine blade rows in one casing (first casing 80), and since the pair of low-pressure turbine blade rows (the third low-pressure turbine blade row 26C and the fourth low-pressure turbine blade row 26D) are disposed on the both sides of the high-pressure turbine blade row 22, respectively, it is possible to accommodate these turbine blade rows in one casing (second casing 82). Thus, it is possible to implement the steam turbine facility 4 of a two-casing configuration.

That is, according to the above-described steam turbine facility 4, it is possible to reduce an installation area by reducing the number of casings than ever before, while implementing performance corresponding to that of the conventional high-performance steam turbine having four casings. Therefore, it is possible to implement the steam turbine facility capable of reducing a facility cost, while having high performance.

Moreover, in the steam turbine facility 4 according to the above-described embodiment, since the intermediate-pressure turbine blade row 24 and the pair of low-pressure turbine blade rows (the first low-pressure turbine blade row 26A and the second low-pressure turbine blade row 26B) are disposed in the bearing span of the pair of radial bearings 30A, 30B, respectively, it is possible to accommodate these turbine blade rows in the single casing (first casing 80), and since the high-pressure turbine blade row 22 and the pair of low-pressure turbine blade rows (the third low-pressure turbine blade row 26C and the fourth low-pressure turbine blade row 26D) are disposed in the bearing span of the pair of radial bearings 31A, 31B, respectively, it is possible to accommodate these turbine blade rows in the single casing (second casing 82). Thus, it is possible to implement the steam turbine facility 4 of the two-casing configuration, and to reduce the installation area as compared to the conventional high-performance steam turbine.

Moreover, in the steam turbine facility 4 according to the above-described embodiment, since the thrust bearing 68 for rotatably supporting the rotor shaft 28 is disposed between the casings (that is, between the first casing 80 and the second casing 82), it is possible to dispose the origin of thermal expansion in the axial direction of the rotor shaft 28 between the casings. Thus, it is possible to reduce an influence by the thermal expansion of the first casing 80, the second casing 82, and components accommodated in these casings, respectively, on both sides of the thrust bearing 68 in the axial direction.

Moreover, in the steam turbine facility 4 according to the above-described embodiment, since the part of the steam flow from the intermediate-pressure turbine blade row 24 toward the first low-pressure turbine blade row 26A is introduced to the second low-pressure turbine blade row 26B, the third low-pressure turbine blade row 26C, and the fourth low-pressure turbine blade row 26D via the branched channel 62, it is possible to implement the high-performance steam turbine facility 4 of the four-flow exhaust type, while achieving the two-casing configuration capable of reducing the installation area.

In the exemplary embodiment shown in FIG. 2, the first inner channel 64 of the branched channel 62 is an annular channel formed by an outer circumferential surface 36a of the inner casing 36 and an inner circumferential surface 20a of the outer casing 20 of the first casing 80. Moreover, the second inner channel 66 of the branched channel 62 is an annular channel formed by an outer circumferential surface 37a of the inner casing 37 and an inner circumferential surface 21a of the outer casing 21 of the second casing 82.

Thus at least partially forming the branched channel 62 by using the outer casings 20, 21 and the inner casings 36, 37 positioned on the inner sides of the outer casings 20, 21, respectively, it is possible to implement the steam turbine facility 4 capable of reducing the installation area and having high performance, by the simple configuration.

In addition, since the first inner channel 64 and the second inner channel 66 of the branched channel 62 are the annular channels, respectively, it is easy to ensure a large channel area of the branched channel 62.

The outer casings 20, 21 may be produced from sheet metal. Moreover, the inner casings 36, 37 may each be produced as a casting.

The steam flowing through the branched channel 62 disposed downstream of the intermediate-pressure turbine blade row 24 has a relatively low temperature. A difference between a pressure of this steam having a relatively low pressure and a pressure (typically, the atmospheric pressure) outside the outer casings 20, 21 is relatively small, making it possible to have a required strength even if the outer casings 20, 21 are produced from the sheet metal. Thus, producing the outer casings 20, 21 from the sheet metal, it is possible to implement the above-described steam turbine facility 4 at a relatively low cost, while having the strength required as the steam turbine facility 4.

In the embodiment shown in FIG. 2, guide members 48 for guiding the flow of steam in the first inner channel 64 are disposed radially inner side of the outer casing 20 and radially outer side of the inner casing 36. The guide members 48 are disposed obliquely with respect to the axial direction of the steam turbine facility 4 to be gradually distanced from a center axis O of the rotor shaft 28 toward a center position between the pair of low-pressure turbine blade rows 26A, 26B, in the axial direction.

Moreover, in the embodiment shown in FIG. 2, guide members 49 for guiding the flow of steam in the second inner channel 66 are disposed radially inner side of the outer casing 21 and radially outer side of the inner casing 37. The guide members 49 are disposed obliquely with respect to the axial direction of the steam turbine facility 4 to be gradually distanced from the center axis O of the rotor shaft 28 toward a center position between the pair of low-pressure turbine blade rows 26C, 26D, in the axial direction.

Moreover, in the embodiment shown in FIG. 2, the outer circumferential surfaces 36a, 37a of the inner casings 36, 37 each have a smooth shape including a convex curve protruding radially outward, in a cross-section along the axial direction.

Disposing the above-described guide members 48, 49 or forming each of the outer circumferential surfaces 36a, 37a of the inner casings 36, 37 into the smooth shape as described above, it is possible to reduce turbulence of a steam flow in the branched channel 62, and thus to reduce a fluid loss.

An insulator may be disposed on the member forming the branched channel 62 or the surface of a member disposed in the branched channel 62. For example, in the embodiment shown in FIG. 2, insulators 56, 57 are disposed on the outer circumferential surfaces 36a, 37a of the inner casings 36, 37 forming the first inner channel 64 and the second inner channel 66 (branched channel 62), respectively. Moreover, although not illustrated in particular, an insulator may be disposed in a portion of the high-pressure inlet pipe 38 or the high-pressure outlet pipe 40 passing through the second inner channel 66 (branched channel 62). In addition, as shown in FIG. 2, insulators 58, 59 may be disposed on the inner circumferential surfaces 20a, 21a of the outer casings 20, 21 forming the branched channel 62 and the surfaces of the guide members 48, 49, respectively.

Disposing the above-described insulators, it is possible to suppress heat dissipation from the inner casings 36, 37, the high-pressure inlet pipe 38 or the high-pressure outlet pipe 40, and the like where steam of a relatively high temperature flows to the first inner channel 64 and the second inner channel 66 (branched channel 62) where steam of relatively low temperature flows. Thus, it is possible to suppress an efficiency decrease of the steam turbine facility 4 caused by such heat dissipation.

In some embodiments, the branched channel 62 may at least partially be formed by a pipe passing outside the outer casing 20 (first casing 80) or the outer casing 21 (second casing 82).

Although not illustrated in particular, for example, in an embodiment, the branched channel 62 includes a first pipe, a second pipe, and a connection pipe disposed between the first pipe and the second pipe. The first pipe passes outside the first casing 80, and causes the inlet side of the first low-pressure turbine blade row 26A and the inlet side of the second low-pressure turbine blade row 26B to communicate with each other. The second pipe passes outside the second casing 82, and causes the inlet side of the third low-pressure turbine blade row 26C and the inlet side of the fourth low-pressure turbine blade row 26D to communicate with each other. The connection pipe having an end connected to the above-described first pipe and another end connected to the above-described second pipe.

Thus at least partially forming the branched channel 62 by the pipes passing outside the outer casings 20, 21, respectively, it is possible to implement the steam turbine facility 4 capable of reducing the installation area and having high performance, by the simple configuration.

In the exemplary embodiment shown in FIG. 2, the connection pipe 65 of the branched channel 62 is connected to a steam introduction path 74. The steam introduction path 74 is configured to introduce steam having a pressure lower than a pressure of steam in an inlet of the first low-pressure turbine blade row 26A to the connection pipe 65 (branched channel 62).

Thus introducing the steam having the pressure lower than the pressure of the steam in the inlet of the first low-pressure turbine blade row 26A to the connection pipe 65 (branched channel 62) via the steam introduction path 74, the steam with the lower pressure introduced from the steam introduction path 74 to the branched channel 62 is introduced to the third low-pressure turbine blade row 26C and the fourth low-pressure turbine blade row 26D, in addition to a part of steam flowing into the inlet of the first low-pressure turbine blade row 26A. Therefore, it is possible to improve output power of the steam turbine facility 4.

Note that in the embodiment shown in FIG. 2, since the connection pipe 65 of the branched channel 62 passes outside the first casing 80 and the second casing 82, it is possible to easily connect the steam introduction path 74 to the connection pipe 65.

Moreover, in the exemplary embodiment shown in FIG. 2, the high-pressure turbine blade row 22 and the intermediate-pressure turbine blade row 24 are disposed such that the steam flowing through the high-pressure turbine blade row 22 and the steam flowing through the intermediate-pressure turbine blade row 24 flow in opposite directions to each other in the axial direction. Moreover, the first low-pressure turbine blade row 26A and the second low-pressure turbine blade row 26B are disposed such that the steam flowing through the first low-pressure turbine blade row 26A and the steam flowing through the second low-pressure turbine blade row 26B flow in opposite directions to each other in the axial direction. Furthermore, the third low-pressure turbine blade row 26C and the fourth low-pressure turbine blade row 26D are disposed such that the steam flowing through the third low-pressure turbine blade row 26C and the steam flowing through the fourth low-pressure turbine blade row 26D flow in opposite directions to each other in the axial direction.

Thus disposing the respective turbine blade rows such that the steam flowing through the high-pressure turbine blade row 22 and the steam flowing through the intermediate-pressure turbine blade row 24 flow in the opposite directions to each other in the axial direction, and the steams flowing through the first low-pressure turbine blade row 26A and the second turbine blade row 26B, respectively, flow in the opposite directions to each other in the axial direction, it is possible to balance a thrust load acting on the rotor shaft 28.

Furthermore, since the respective turbine blade rows are disposed such that the steams flowing through the third low-pressure turbine blade row 26C and the fourth low-pressure turbine blade row 26D, respectively, flow in the opposite directions to each other in the axial direction, it is possible to balance the thrust load acting on the rotor shaft 28 more effectively.

Figure 3:
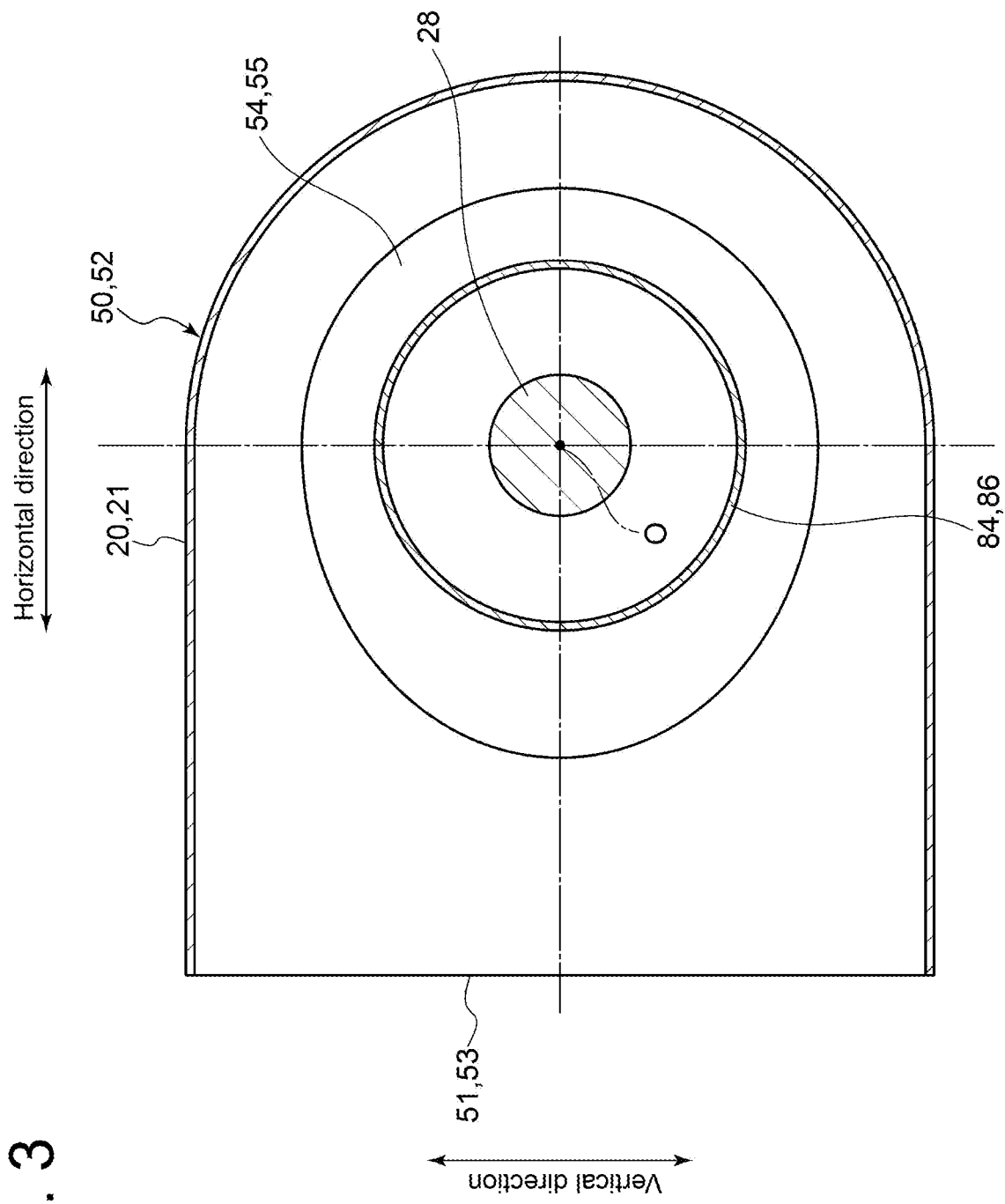
FIG. 3 is a cross-sectional view taken along line A-A (or a cross-sectional view taken along line A'-A') in FIG. 2.

FIG. 3 is a schematic cross-sectional view of the exhaust chamber 50 or the exhaust chamber 52 for the steam turbine facility 4 according to an embodiment, and is a cross-sectional view taken along line A-A of FIG. 2 or line A'-A' of FIG. 2.

In some embodiments, as shown in FIG. 3, the exhaust chamber 50, 52 for the steam turbine facility 4 may include the exhaust chamber outlet 51, 53 positioned on the lateral side thereof.

The lateral side of the exhaust chamber 50, 52 refers to a direction away from the center axis O of the rotor shaft 28 in the horizontal direction, when the exhaust chamber 50, 52 is viewed from the axial direction (see FIG. 3).

In this case, the steam having passed through the first/second low-pressure turbine blade row 26A, 26B and the third/fourth low-pressure turbine blade row is laterally exhausted toward the condenser 34 via the exhaust chamber outlet 51, 53 disposed on the lateral side of the exhaust chamber 50, 52. That is, since the condenser 34 can be disposed on the lateral side of the exhaust chamber 50, 52, it is possible to reduce the size of the steam turbine facility 4 in the height direction, as compared with a case in which the condenser 34 is positioned below the exhaust chamber 50, 52. Therefore, it is possible to reduce the facility cost of the steam turbine facility 4 more effectively.

Note that the one condenser 34 may be disposed for each casing. That is, the one condenser 34 may be disposed in correspondence with the pair of exhaust chambers 50 provided for the first casing 80, and the one condenser 34 may be disposed in correspondence with the pair of exhaust chambers 52 provided for the second casing 82.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Combined cycle plant
2 Gas turbine facility
4 Steam turbine facility
6 Heat recovery steam generator
7 Stator vane
8 Rotor blade
10 Compressor
12 Combustor
14 Turbine
16 Rotational shaft
18 Generator
20 Outer casing
20a Inner circumferential surface
21 Outer casing
21a Inner circumferential surface
22 High-pressure turbine blade row
24 Intermediate-pressure turbine blade row
26A First low-pressure turbine blade row
26B Second low-pressure turbine blade row
26C Third low-pressure turbine blade row
26D Fourth low-pressure turbine blade row
27 First shaft part
28 Rotor shaft
29 Second shaft part
30A, 30B Radial bearing
31A, 31B Radial bearing
32 Generator
34 Condenser
34 Inner casing
36a Outer circumferential surface
37 Inner casing
37a Outer circumferential surface
38 High-pressure inlet pipe
40 High-pressure outlet pipe
42 Intermediate-pressure inlet pipe
44 Low-pressure inlet pipe
48 Guide member
49 Guide member
50 Exhaust chamber
51 Exhaust chamber outlet
52 Exhaust chamber
53 Exhaust chamber outlet
54 Flow guide
55 Flow guide
56 Insulator
57 Insulator
58 Insulator
59 Insulator
60 Seal part
61 Seal part
62 Branched channel
63 Seal part
64 First inner channel
65 Connection pipe
66 Second inner channel
68 Thrust bearing
70 Coupling
74 Steam introduction path
80 First casing
82 Second casing
84 Bearing cone part
86 Bearing cone part
O Center axis

The invention claimed is:
1. A steam turbine facility, comprising:
a rotor shaft;
a high-pressure turbine blade row and an intermediate-pressure turbine blade row disposed on the rotor shaft;
a first low-pressure turbine blade row and a second low-pressure turbine blade row disposed on the rotor shaft on both sides of the intermediate-pressure turbine blade row, respectively; and a third low-pressure turbine blade row and a fourth low-pressure turbine blade row disposed on the rotor shaft on both sides of the high-pressure turbine blade row, respectively, wherein the steam turbine facility is configured such that steam having passed through the intermediate-pressure turbine blade row is divided to flow into the first low-pressure turbine blade row, the second low-pressure turbine blade row, the third low-pressure turbine blade row, and the fourth low-pressure turbine blade row, wherein the steam turbine facility further comprises a first pair of radial bearings and a second pair of radial bearings for rotatably supporting the rotor shaft, wherein the intermediate-pressure turbine blade row, the first low-pressure turbine blade row, and the second low-pressure turbine blade row are disposed on the rotor shaft in a bearing span of the first pair of radial bearings, and wherein the high-pressure turbine blade row, the third low-pressure turbine blade row, and the fourth low-pressure turbine blade row are disposed on the rotor shaft in a bearing span of the second pair of radial bearings.

2. A steam turbine facility comprising:
a rotor shaft;
a high-pressure turbine blade row and an intermediate-pressure turbine blade row disposed on the rotor shaft;
a first low-pressure turbine blade row and a second low-pressure turbine blade row disposed on the rotor shaft on both sides of the intermediate-pressure turbine blade row, respectively; and
a third low-pressure turbine blade row and a fourth low-pressure turbine blade row disposed on the rotor shaft on both sides of the high-pressure turbine blade row, respectively, wherein the steam turbine facility is configured such that steam having passed through the intermediate-pressure turbine blade row is divided to flow into the first low-pressure turbine blade row, the second low-pressure turbine blade row, the third low-pressure turbine blade row, and the fourth low-pressure turbine blade row, wherein the steam turbine facility further comprises:
a first casing for accommodating the intermediate-pressure turbine blade row, the first low-pressure turbine blade row, and the second low-pressure turbine blade row; and
a second casing for accommodating the high-pressure turbine blade row, the third low-pressure turbine blade row, and the fourth low-pressure turbine blade row.

3. The steam turbine facility according to claim 2, further comprising:
a thrust bearing for rotatably supporting the rotor shaft,
wherein the thrust bearing is disposed between the first casing and the second casing.

4. A steam turbine facility, comprising:
a rotor shaft;
a high-pressure turbine blade row and an intermediate-pressure turbine blade row disposed on the rotor shaft;
a first low-pressure turbine blade row and a second low-pressure turbine blade row disposed on the rotor shaft on both sides of the intermediate-pressure turbine blade row, respectively; and
a third low-pressure turbine blade row and a fourth low-pressure turbine blade row disposed on the rotor shaft on both sides of the high-pressure turbine blade row, respectively, wherein the steam turbine facility is configured such that steam having passed through the intermediate-pressure turbine blade row is divided to flow into the first low-pressure turbine blade row, the second low-pressure turbine blade row, the third low-pressure turbine blade row, and the fourth low-pressure turbine blade row, wherein the first low-pressure turbine blade row is disposed downstream of the intermediate-pressure turbine blade row in a steam flow direction in the intermediate-pressure turbine blade row, and wherein the steam turbine facility includes a branched channel for introducing a part of a steam flow from the intermediate-pressure turbine blade row toward the first low-pressure turbine blade row to the second low-pressure turbine blade row, the third low-pressure turbine blade row, and the fourth low-pressure turbine blade row.

5. The steam turbine facility according to claim 4, comprising:
a first casing for accommodating the intermediate-pressure turbine blade row, the first low-pressure turbine blade row, and the second low-pressure turbine blade row; and
a second casing for accommodating the high-pressure turbine blade row, the third low-pressure turbine blade row, and the fourth low-pressure turbine blade row, wherein the branched channel includes:
a first inner channel disposed so as to cause an inlet side of the first low-pressure turbine blade row and an inlet side of the second low-pressure turbine blade row to communicate with each other, in the first casing;
a second inner channel disposed so as to cause an inlet side of the third low-pressure turbine blade row and an inlet side of the fourth low-pressure turbine blade row to communicate with each other, in the second casing; and
a connection pipe having an end connected to the first inner channel in the first casing and another end connected to the second inner channel in the second casing.

6. The steam turbine facility according to claim 4, comprising:
a first casing for accommodating the intermediate-pressure turbine blade row, the first low-pressure turbine blade row, and the second low-pressure turbine blade row, wherein the first casing includes:
an inner casing for accommodating the intermediate-pressure turbine blade row; and
an outer casing for accommodating the inner casing, and at least a part of the first low-pressure turbine blade row and the second low-pressure turbine blade row, and wherein the branched channel is formed at least partially by an outer surface of the inner casing and an inner surface of the outer casing.

7. The steam turbine facility according to claim 4, comprising:
a first casing for accommodating the intermediate-pressure turbine blade row, the first low-pressure turbine blade row, and the second low-pressure turbine blade row,
wherein the first casing includes:
an inner casing for accommodating the intermediate-pressure turbine blade row; and
an outer casing for accommodating the inner casing, and at least a part of the first low-pressure turbine blade row and the second low-pressure turbine blade row, and
wherein the branched channel is formed at least partially by a pipe passing outside the outer casing.

8. The steam turbine facility according claim 4, further comprising:
a steam introduction path connected to the branched channel, for introducing steam having a pressure lower than a pressure of steam in an inlet of the first low-pressure turbine blade row.

9. The steam turbine facility according to claim 1,
wherein the steam turbine facility is configured such that steam flowing through the high-pressure turbine blade row and steam flowing through the intermediate-pressure turbine blade row flow in opposite directions to each other in an axial direction,
wherein the steam turbine facility is configured such that steam flowing through the first low-pressure turbine blade row and steam flowing through the second low-pressure turbine blade row flow in opposite directions to each other in the axial direction, and
wherein the steam turbine facility is configured such that steam flowing through the third low-pressure turbine blade row and steam flowing through the fourth low-pressure turbine blade row flow in opposite directions to each other in the axial direction.

10. The steam turbine facility according to claim 1, further comprising:
an exhaust chamber for discharging steam from the first low-pressure turbine blade row and from the second low-pressure turbine blade row toward a condenser,
wherein the exhaust chamber has an exhaust chamber outlet disposed on a lateral side thereof.

11. The steam turbine facility according to claim 1, further comprising:
a condenser for condensing steam from the first low-pressure turbine blade row and from the second low-pressure turbine blade row.

12. A combined cycle plant, comprising:
a gas turbine facility;
a boiler for generating steam by heat of a discharged gas from the gas turbine facility; and
the steam turbine facility according to claim 1,
wherein the steam turbine facility is configured to be driven by the steam generated by the boiler.

* * * * *